Figure 1:
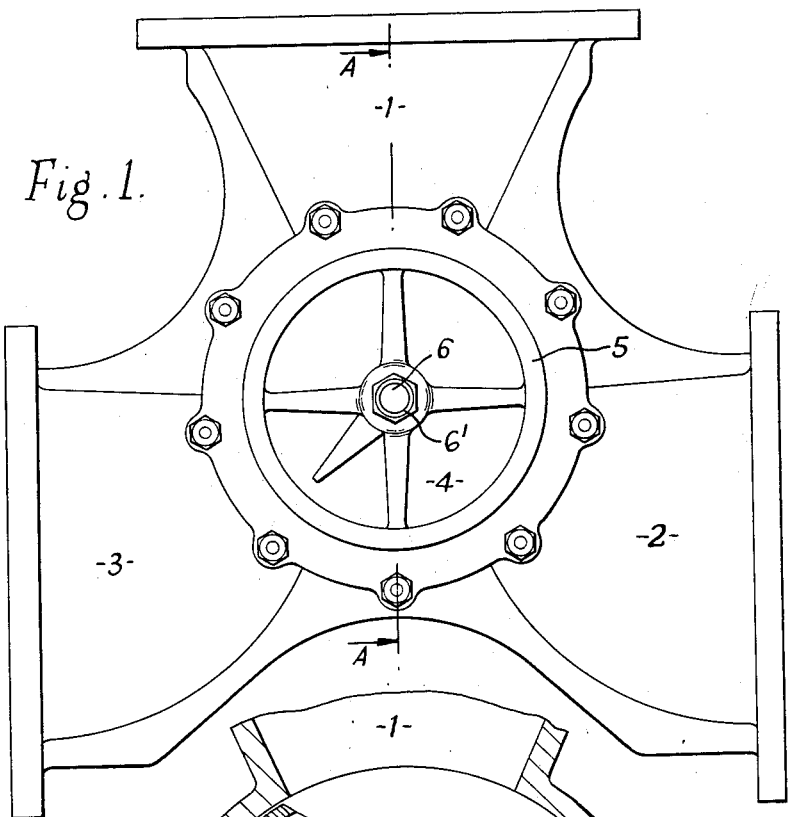

March 3, 1964    J. A. LIPSCOMBE ETAL    3,123,297
THERMOSTATICALLY CONTROLLED VALVES
Filed May 1, 1962    2 Sheets-Sheet 1

JOHN A. LIPSCOMBE
INVENTOR

BY Wenderoth, Lind
& Ponack
ATTORNEYS

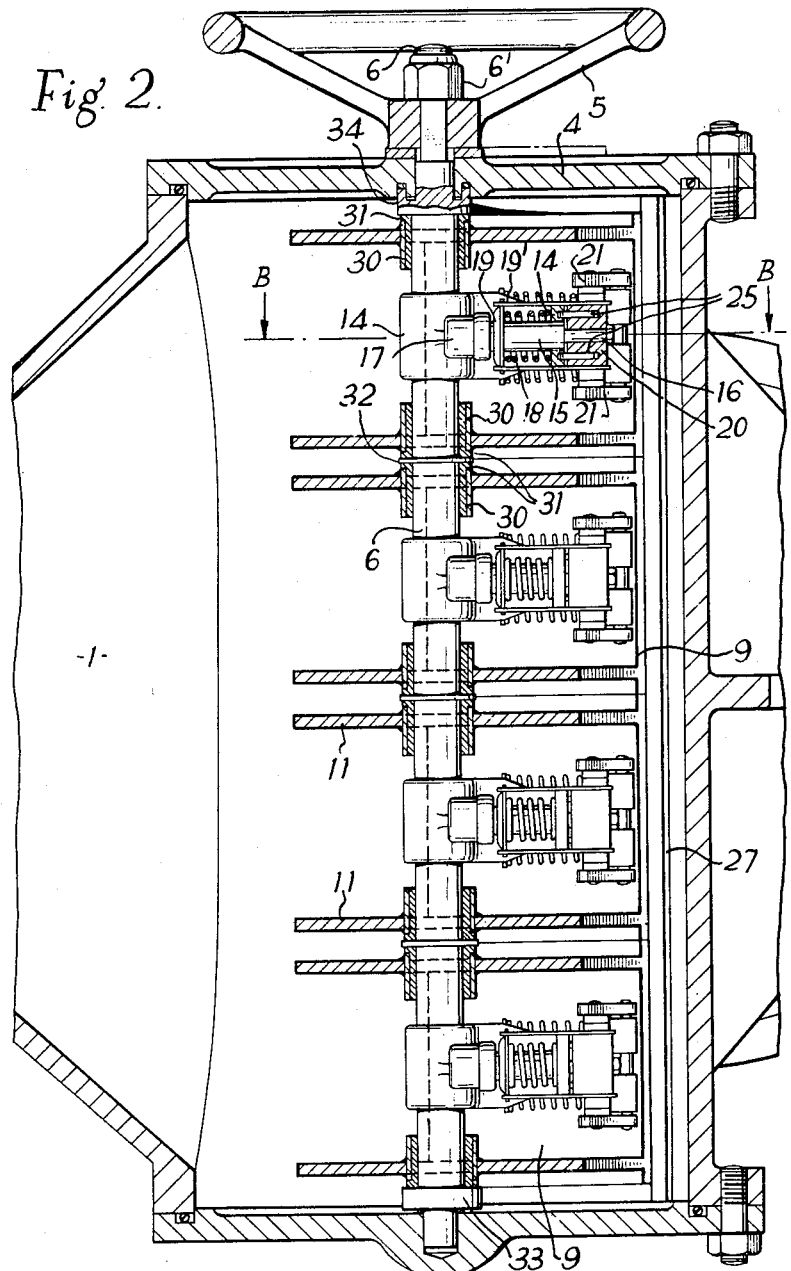

United States Patent Office 3,123,297
Patented Mar. 3, 1964

3,123,297
THERMOSTATICALLY CONTROLLED VALVES
John Alfred Lipscombe, Ashford, near Staines, Middlesex, England, assignor to Walton Engineering Co. Limited, London, England, a British company
Filed May 1, 1962, Ser. No. 192,041
Claims priority, application Great Britain May 10, 1961
2 Claims. (Cl. 236—34.5)

The present invention relates to thermostatically controlled valves and in particular to large sizes of such valves, for example, valves of sizes for connection to pipes of upwards of 6 inches diameter.

It is known that rotary valves of the type in which two ports are controlled by a rotor having a pair of diametrically opposite arcuate shutter members, mounted on a spindle, require little force for moving the rotor in relation to the ports, but even with such valves there is a practical limit as to the size of rotor which can be turned by a single thermostat element of the commercially available wax-filled type.

According to the present invention there is provided a rotary valve of the above type, characterised in that the rotor is divided into two or more separate sections, arranged end to end in relation to each other and rotatable independently of each other on a stationary axial spindle, each of said rotor sections being moved angularly by the force exerted by a thermostat element associated therewith, the thermostat element associated with each rotor section being of the wax-filled type.

Each rotor section is preferably connected by a pivoted linkage to a movable plunger of a thermostat. The longitudinal movement of the plunger of a wax-filled thermostat element is about ⅜ inch (about 9.4 mms.) at most. Although theoretically it would be possible to make a thermostat element of that type with a longer plunger movement, this would require the use of a larger body of wax. This, in turn, would slow down the response of the thermostat element to temperature change, since wax is a poor thermal conductor, and the lag of the thermostat element would not be acceptable.

With a plunger travel of only ⅜ inch (9.4 mms.) it is necessary to arrange that the thermostat is secured to the spindle in such manner that the axis of the thermostat plunger lies within about ¾ inch (18.8 mms.) of the axis of the rotor to secure the angular movement of the rotor of, say, 30° through a direct linkage between the plunger and the rotor. However, with large sizes of valve, particularly those of large axial length, it is necessary for the valve spindle to be of at least 1 inch (25.4 mms.) diameter so as to withstand the differential pressures on the rotor shutters without substantial deflection.

In order to keep the axial length down as much as possible and thus to reduce the problem of spindle deflection to a minimum, it is desirable that the width of the valve ports should approach as nearly as possible their theoretical maximum of 60°, and to enable such wide valve ports to be used the angular movement of the rotor must be rather in excess of the valve port width. Thus, it will be seen that to obtain the most compact form of large valve it is necessary to incorporate a movement multiplying linkage between the thermostat plunger and the rotor.

To achieve this result the plunger of the thermostat element, the barrel of which is clamped to the spindle, is preferably connected to the shorter arm of a lever, pivoted on a swinging fulcrum connected to the spindle. The longer arm of the lever is connected to the associated rotor section through a pivoted linkage, so that the movement of the thermostat element plunger is multiplied.

Bearing washers are placed between adjacent rotor sections to permit easy relative rotation of the rotor sections, particularly in the event of thermostat element failure, but also to allow for slight relative movement arising out of the slight difference of thermal response between different thermostat elements. In a large valve, such as a 12-inch valve, four or more separate rotor sections may be used and in such event the reduction in efficiency and error in controlling temperature in the event of failure of one thermostat element is not great. The present invention thus provides a valve which is controlled by the motive force of a thermostat element and which can be constructed in larger sizes than have hitherto been attempted in practice for that type of valve.

A particular advantage of the use of a divided rotor is that the rotor sections may be of standard size and the number of rotor sections employed will then depend on the capacity of the valve, within a given range.

One construction of valve is hereinafter described with reference to the accompanying drawings, wherein:

FIGURE 1 is a plan view of a valve.
FIGURE 2 is a longitudinal section on line A—A of FIGURE 1, and
FIGURE 3 is a cross section on line B—B of FIGURE 2.

FIGURE 1 gives an external view of a rotary valve of the type to which the present invention refers. The valve comprises a body with three connection flanges for ports 1, 2 and 3, which are respectively intended to serve as an inlet, an outlet to a cooler and a by-pass outlet back to the water jacket of an engine. The inlet port 1 could alternatively be provided in one end cover of the casing. In this figure there are also shown an end cover 4, which is bolted to the body and a handwheel 5, which can be used to adjust the position of the spindle 6 against the braking resistance provided by clamping the handwheel 5 against the end cover 4 by means of a nut 6'.

Figure 3:
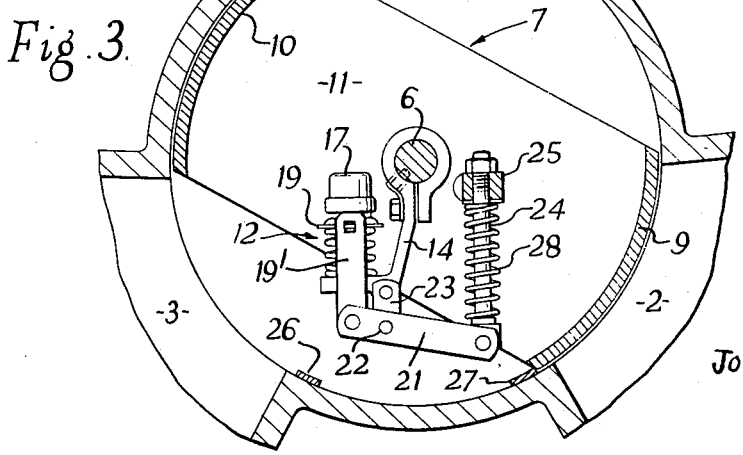

Referring now to FIGURES 2 and 3, it will be seen that the ports 2 and 3 are controlled (see FIGURE 3) by four rotor sections 7, each of which has arcuate shutter members 9 and 10, which are connected by cross webs 11 to form the rotor section 7. The temperature sensitive element 12 is secured to the spindle 6 by means of a clamp 14 in which the barrel 15 of the element 12 is held. The piston rod 16 of the element 12 is forced outwardly by the thermal expansion of wax held in an enclosed chamber 17 which is secured to the barrel 15. The piston rod 16 is forced outwardly against the force of a return spring 18, acting on a sliding collar 19, to which the piston rod 16 is secured by links 19'. The construction of the element 12 is, however, well-known in the art. The end of the piston rod 16 is threaded into a head piece 20.

The head piece 20 is pivoted to a pair of parallel links 21, which are pivoted to a swinging fulcrum, formed by a pivot pin 22, held in a link 23 pivoted to the clamp member 14. The other ends of the links 21 are pivotally connected to a push rod 24, which is a sliding fit in a rotatable member 25 connecting the transverse webs 11.

It will be observed that the head piece 20 is connected much closer to the fulcrum point 22 than is the push rod 24, so that the movement of the push rod is magnified in comparison with the movement of the piston rod.

In this construction the limits of the movement of the shutter members 9 and 10 are determined by stops 26 and 27. The thrust from the rod 24 is therefore transmitted to the member 25 through a spring 28 so as to avoid damage in the event of excess expansion of the element 12.

As will be seen in FIGURE 2, each rotor section is provided with bearing bushes 30, having thrust flanges 31, which engage against thrust washers 32, arranged between the rotor sections 7. At its lower end the spindle 6 carries an abutment collar 33 threaded onto it and at the upper end has an integral abutment 34, against which the thrust flanges 31 of the end rotor sections 7 bear.

As will be understood the edges of the shutter members 9 and 10 of adjacent rotor sections 7 are arranged to have a very small clearance between them so as to reduce the leakage through the gap between them to a small value. The thrust washers 32 may be in the form of shims to produce the desirable small clearance between the shutters.

In addition to utilising single thermostat elements two or more thermostat elements may be used in series as described in co-pending patent application No. 156,103, now Patent No. 3,088,672, where it is desired to extend the effective temperature range of the valve or to apply more torque to each section.

In order to relieve the piston rod 16 from the effect of side loads, guide pins 35, threaded into the clamp 14, extend parallel with the piston rod 16 and slide in guide apertures in the headpiece 20.

I claim:
1. A rotary valve, comprising a cylindrical casing having at least three ports spaced around the periphery of said casing, a single fixed shaft extending axially of said cylindrical casing, a plurality of rotors rotatably mounted on said shaft and each having at least two curved shutter members thereon spaced from each other around the cylindrical casing and being substantially aligned with the corresponding shutter members on the other rotors, said shutter members on each rotor being spaced around the casing so as to leave at least one port covered and at least one port open in an end position of rotation of said rotor, the corresponding shutter members on all of the rotors completely closing a port when they cover it in one end position of rotation of the rotor, said curved shutter members being sections of a cylinder wall having a curvature substantially the same as the curvature of the interior of said cylindrical casing and being movable along the interior of said cylindrical casing closely adjacent thereto and each extending in the peripheral direction of said casing a distance slightly greater than the dimension of a port in the peripheral direction, and a plurality of thermostat driving elements of the wax filled type, one for each rotor, said thermostat driving elements being fixed to said shaft within a respective rotor section and articulated to the rotor sections for simultaneously rotating the rotor sections by the expansion of the wax in response to a change in temperature within said casing to move at least one of the shutter members on each rotor away from one port and at least one of the other shutter members on each rotor over another port.

2. A rotor valve as claimed in claim 1 in which a movement-multiplying linkage forms the articulated connection between each thermostat driving element and the rotor driven by the thermostat driving element.

References Cited in the file of this patent
UNITED STATES PATENTS

| | | |
|---|---|---|
| 1,000,435 | Pagelsen | Aug. 15, 1911 |
| 2,498,637 | Bay | Feb. 28, 1950 |

FOREIGN PATENTS

| | | |
|---|---|---|
| 554,663 | Great Britain | July 14, 1943 |
| 845,243 | Great Britain | Aug. 17, 1960 |